United States Patent [19]

Back et al.

[11] 4,334,472
[45] Jun. 15, 1982

[54] MECHANISM FOR FEEDING AND TRANSPORTING PRINTING PLATES

[75] Inventors: Günter Back, Diedenbergen; Klaus-Peter Schön, Wiesbaden, both of Fed. Rep. of Germany

[73] Assignee: Hoechst Aktiengesellschaft, Frankfurt am Main, Fed. Rep. of Germany

[21] Appl. No.: 250,126

[22] Filed: Apr. 2, 1981

[30] Foreign Application Priority Data

Apr. 2, 1980 [DE] Fed. Rep. of Germany ....... 3012761

[51] Int. Cl.³ ............................................ B41B 15/32
[52] U.S. Cl. .............................. 101/382 MV; 430/49; 355/76
[58] Field of Search ............... 101/1, 382 R, 382 MV; 430/49; 355/73, 76

[56] References Cited

U.S. PATENT DOCUMENTS

| | | | |
|---|---|---|---|
| 2,923,235 | 2/1960 | Voegelin | 101/382 MV |
| 3,920,333 | 11/1975 | Wally, Jr. | 355/76 |
| 4,006,984 | 2/1977 | Friese | 355/11 |
| 4,149,798 | 4/1979 | McGowan et al. | 355/8 |
| 4,262,594 | 4/1981 | Landsman | 101/382 MV |
| 4,294,540 | 10/1981 | Thettu | 355/76 |

Primary Examiner—E. H. Eickholt
Attorney, Agent, or Firm—Schwartz, Jeffery, Schwaab, Mack, Blumenthal & Koch

[57] ABSTRACT

A mechanism for feeding and transporting printing plates to an exposure table with the aid of transport rollers. The uppermost of the printing plates is stacked in a plate holder. This plate is gripped by a swiveling lifting cylinder and is, after being swung through a semi-circular arc movement, deposited on a suction plate of the exposure table. The transport rollers, which are arranged on either side of the suction plate, are driven by a drive roller in each row via drive belts. Those transport rollers which are the first in each row (from the standpoint of the direction of printing plate travel) are arranged on swivel blocks which are swiveled outwardly from the rows before the printing plate is put down. This enables the forward part of the printing plate to be deposited on the suction plate without jamming. As soon as the printing plate rests on the suction plate, the first transport rollers are swiveled towards the lateral edges of the printing plate which is then transported forward, its lateral edges being guided in grooves provided in the transport rollers.

18 Claims, 3 Drawing Figures

MECHANISM FOR FEEDING AND TRANSPORTING PRINTING PLATES

BACKGROUND OF THE INVENTION

1. Technical Field of the Disclosure

The present invention relates to a mechanism for feeding and transporting printing plates to an exposure table, with the aid of rollers.

2. Description of the Prior Art

Lettered and imaged printing masters which are directly suitable for printing are manufactured in such a way that the printing plates are first electrostatically charged and that an original is then projected imagewise upon the individual plate. After this exposing procedure, the printing master is developed with a developer, fixed and decoated and is then ready for printing.

U.S. Pat. No. 4,006,984 discloses an apparatus for the manufacture of printing masters by electrophotographic means, in which the individual printing plate is picked up from a stack in a plate holder by a transport device comprised of a transport carriage with a reduced pressure-suction means. The transport carriage transfers the printing plate to an exposure platform. Charging of the individual printing plate and transporting it to the exposure station are combined in a time-saving manner by mounting at the front of the transport carriage a corona charging station for the electrostatic charging of the printing plates. The corona charging station extends transversely to the direction of motion of the carriage. The carriage runs on two guide rails and is driven by a motor positioned on top of it. The carriage engages via a gear wheel with a rack-and-pinion gear which is arranged parallel to the direction of motion of the transport carriage. The transport carriage has a vacuum plate which is attached to its underside and which is, by a number of holes, connected with a vacuum pump. When the transport carriage is placed upon the upper side of the printing plate which lies on top in the plate holder, reduced pressure is generated, and the printing plate is sucked to the vacuum plate. The transport carriage is then displaced in the direction of the exposure platform by means of the motor. As soon as the carriage has reached its position above the exposure platform, it is lowered. The vacuum is released so that the printing plate is set free and is deposited on the exposure platform. The exposure platform is also designed as a vacuum plate; and, under the action of reduced pressure, the printing plate is firmly urged against the platform.

In this previously proposed apparatus, the photoconductive, coated side of the printing plate is touched by suction means when the individual printing plate is picked up from the stack. Compared with rollers or webs which, in other known apparatuses, are guided over the coated side of the printing plate, the suction means allow a considerably gentler transport of the printing plate. Nevertheless, even with the application of suction means, mechanical or physical defects on the developed printing master cannot be precluded with certainty.

In U.S. Pat. No. 4,149,798, a transport station for printing plates is described, which includes a stacking area containing a supply of printing masters. A paper disposal area is provided for the sheets of paper which are interposed between the individual masters in the stack. By means of a control mechanism equipped with a number of suction cups, the printing masters are transported from the stacking area to a conveyor. The control mechanism is pivotally attached to a support arm which is connected to a motor via a gear mechanism. Thus, the control mechanism is adapted to perform a lateral sliding movement back and forth. The uppermost printing plate in the stack is picked up by at least four suction cups of the control mechanism. Then the control mechanism swings upwards; and, at the same time, the support arm mechanically approaches the conveyor. When the vacuum in the suction cups is released, the control mechanism pivots downwards and deposits the printing plate on the conveyor. A second control mechanism positioned above the paper separation sheet engages the sheet, picks it up and conveys it to the paper disposal area.

The conveyor transports the printing master to an exposure platform which has a plurality of holes in its upper surface and which comprises a chamber connected to a vacuum pump by a vacuum line. After the printing master has adopted the correct position on the surface of the exposure platform, a vacuum is generated; and the master is thus securely retained on the platform. The exposure system used to expose the printing master comprises a movable carriage to which a corona charging device and a light reflecting mirror are attached. A laser which emits modulated laser light is arranged in such a way that the light scan emitted by the laser is deflected by the mirror and impinges upon the printing master retained on the exposure platform in a plane which is approximately perpendicular to the surface of the master.

As in the above-described prior art apparatus, the printing plate lying on top in the stack is picked up in such a way that its photoconductive layer comes into contact with suction means; and this may lead to mechanical or physical defects on the finished printing master.

SUMMARY OF THE INVENTION

To keep the photoconductive layer of the printing plate from being mechanically contacted during transport from a plate holder or magazine to an exposure table, a simultaneously-filed, companion application by the present applicants Ser. No. 250,124 entitled "Mechanism for Transporting Printing Plates" provides a swiveling lifting cylinder equipped with a piston rod which can be extended from and retracted into the lifting cylinder and which carries a dish-shaped plate for gripping by suction and depositing the uppermost printing plate in the stack, the lifting cylinder being swiveled about a pivotal point between a receiving position and a depositing position of the printing plate.

The problem which is then encountered is that the printing plate, which is lowered from above in a circular arc-movement on a support surface with its photoconductive, coated side facing upwards, must be transferred to a roller-equipped mechanism for further transport without being deposited on the rollers upon lowering and without contacting the rollers with its photoconductive layer.

According to the invention, this problem is solved in such a way: that a swiveling lifting cylinder removes the printing master in the form of a printing plate from a plate holder, swivels it through a circular arc, and places it with its forward part on a suction plate of an exposure table; that a row of transport and drive rollers each is arranged parallel to the two lateral edges of the printing plate in the transport direction; and that the transport rollers which are the first in the direction of transport of the printing plate are capable of being swiveled outwards from the rows so that the forward part of the printing plate can be deposited on the suction plate of the exposure table without jamming.

In a further development of the invention, the transport rollers and drive rollers of a row are rotatably mounted on roller blocks which are attached to an angle bar and, in addition, the roller blocks of the transport rollers, which are located first in the transport direction, are constructed as swivel blocks. The exposure table, as a support surface for the printing plate, appropriately comprises the suction plate. Below the suction plate, a lifting magnet is mounted which is connected to the two swivel blocks by a lever system. By means of the lever system, it is possible to turn the swivel blocks outwards so that the printing plate sucked to the lifting cylinder, which is, in a circular arc-movement, deposited from above on the suction plate, is put down between the outwardly swiveled transport rollers and the following stationary transport rollers. The printing plate can be further transported after turning the first rollers inwards again so that they lie against the lateral edges of the printing plate.

To reiterate, and to express the foregoing in somewhat different terms, the present invention entails a mechanism for feeding printing plates to an exposure table, which exposure table includes a suction plate for holding a printing plate in place, the printing plates being fed to the exposure table in a transport direction. Each printing plate has a forward part which approaches the exposure table first during feeding of the printing plate in the transport direction. Each printing plate, of course, also has a pair of lateral edges. The mechanism of the invention includes a plurality of transport rollers and a plurality of drive rollers, the transport and drive rollers cooperating with each other. The transport and drive rollers are mutually so arranged as to include two rows of rollers with a space between each row, each row including a plurality of transport rollers and at least one drive roller. The rollers are arranged so as to be in generally parallel relationship with the lateral edges of a printing plate which may be disposed in the space between the rows. The rows extend in the transport direction, and each row includes a transport roller which is the first roller relative to the transport direction in such row. Thus, the two rows together include two such first rollers. There is also means for effecting swiveling movement of the first two rollers in an outward direction relative to the space between the rows to enable the forward part of each printing plate to be deposited on the suction plate of the exposure table without damage.

The mechanism includes an angle bar which serves as a base for the mounting of the rollers of one row, each row including one such angle bar. The mechanism also includes a plurality of roller blocks on which the drive rollers and transport rollers are rotatably mounted. The roller blocks on which the first two rollers are mounted are swivelable with respect to the angle bar. Thus, the means for effecting swiveling movement includes these swiveling blocks.

The means for effecting swiveling movement also include a lifting magnet below the suction plate and a lever means for transferring movement of the lifting magnet to the swivelable blocks, the lifting magnet, the lever means and the swivelable blocks being operatively coupled together.

The suction plate, it is to be noted, is at least partially disposed in the aforementioned space between the rows of rollers. The suction plate includes an upper side for holding the printing plate and a lower side below and opposite the upper side. The aforementioned lever means includes a lower side bar for location below the suction plate, a coupling pin, a clamping plate coupled with the lifting magnet, and a slot in the clamping plate, the lower side bar carrying the coupling pin, the coupling pin engaging in the slot of the clamping plate. The lever means also includes a connecting shaft and an upper side bar for location below the suction plate but above the lower side bar. The upper side bar has peripheral ends, and the connecting shaft extends between the lower side bar and the upper side bar. The lever means further includes a plurality of clamping knuckles, the clamping knuckles being fastened to the peripheral ends of the upper side bar. Finally, the lever means includes a plurality of connecting rods, the connecting rods extending between the clamping knuckles and the swivelable blocks.

The lower side bar of course has ends, and the coupling pin cooperates with the lower side bar at a location closer to one of these ends. There is a tension spring having ends, the tension spring extending generally parallel to the lifting magnet. One end of the tension spring engages the other end of the lower side bar, the other end of the tension spring being for coupling with the exposure table.

There is a front and rear signal generator for arrangement in the suction plate. These signal generators are electrically connected to the lifting magnet, which magnet is selectively de-energized and energized by the signal generators. Each printing plate has a front edge adjacent its forward part and a rear edge opposite the forward edge. The signal generators may be switches which are actuated by the front edge and the rear edge, respectively, of the printing plate. More specifically, the signal generators may be proximity switches.

The drive roller of each row has at least one transport roller adjacent thereto, and the transport rollers of each row include at least one pair of adjacent transport rollers. The mechanism includes two drive motors, one for each row of rollers, each drive motor being fastened to the angle bar for its respective row of rollers. There are a plurality of drive belts, some of which extend between the drive rollers and adjacent transport rollers and some of which extend between each pair of adjacent transport rollers. Thus, the transport rollers are driven by the drive rollers via the drive belts. The two drive motors are preferably synchronous motors.

The angle bar includes a vertical arm with an inner wall which faces toward the space between the rows of rollers. At least some of the roller blocks are coupled with means for accommodating transverse displacement thereof with respect to the transport direction. Each displacement accommodating means is in one of the rows and includes an adjusting screw. Each adjusting screw passes through the vertical arm of the angle bar in its respective row and engages a roller block. Each adjusting screw is surrounded by a compression spring which rests against the inner wall of the vertical arm of the angle bar of its respective row and which rests against the roller block. All of the roller blocks of the two rows of transport rollers may be equipped with adjusting screws. Alternatively, the roller blocks of one of the rows of transport rollers may be equipped with the adjusting screws. These rollers of the one row consequently, are displaceable while the roller blocks of the other row of transport rollers are stationarily mounted on the angle bar. Each transport roller has a groove in which one lateral edge of the printing plate is guided during transport.

The suction plate is supported by a suction plate support, the suction plate support having an upper side facing the suction plate. There are a pair of guiding elements for arrangement on the upper side of the suction plate support in transverse relationship with respect to the transport direction. The guiding elements include at least one slot therein. The angle bars are supported on the guiding elements, the angle bars having front and rear ends and a fixing screw at each end. The fixing screws engage the slots in selected positions along the slots. Thus, the positions of the angle bars are transversely adjustable relative to the transport direction.

There is a selectively raisable and lowerable stop pin in the space between the rollers. The stop pin is for disposition in the suction plate to serve as a selective stop for the printing plate.

The feeding mechanism of the present invention is, as indicated, especially useful in connection with a transport system which includes a specific type of swiveling lifting cylinder. In this combined feeding and transporting mechanism, there is a plate holder for holding printing plates, the swiveling lifting cylinder cooperating with the plate holder to remove plates therefrom. There are also means for effecting displacement of the lifting cylinder so that the lifting cylinder moves through an arc and deposits the forward parts of the printing plates on the suction plate.

It is an advantage of the present invention that the printing plate which has been turned over by the lifting cylinder so that its photoconductive side faces upwards and which has been deposited with its forward part on the suction plate of the exposure table, can be brought into the desired position with its coated side facing upwards without mechanically contacting the photoconductive layer of the printing plate during the transport operation.

BRIEF DESCRIPTION OF THE DRAWING

In what follows, the invention is explained in more detail by reference to an examplary embodiment shown in the drawings of which.

DETAILED DESCRIPTION OF THE PREFERRED EMBODIMENT

Figure 1:
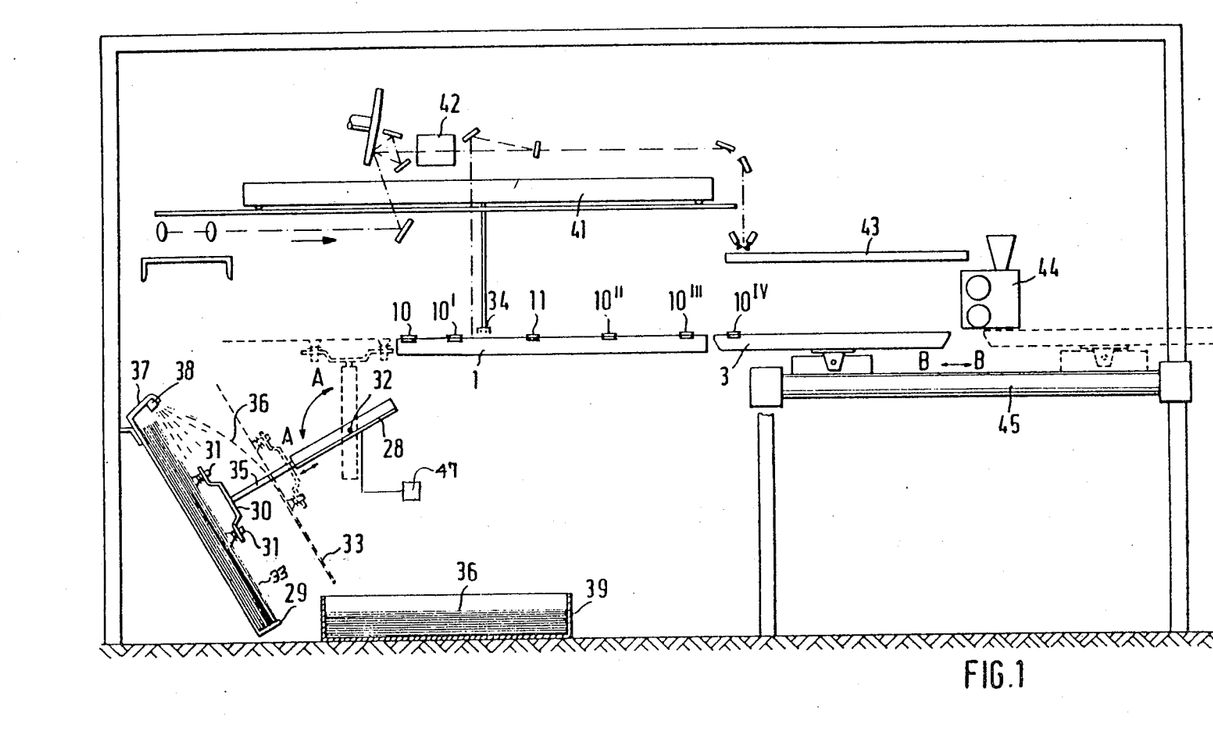
FIG. 1 represents, in a diagrammatic view and schematic form, different processing stations of an apparatus for reproducing an original on the photoconductive surface of a printing plate.

Different processing stations of an apparatus for the reproduction of an original on the surface of a printing plate are diagrammatically shown in FIG. 1. A transport station for the printing plates 33 stored in a plate holder 29 includes a swiveling lifting cylinder 28 equipped with a piston rod 35 which may be extended from and retracted into the lifting cylinder. The printing plates 33 are stacked in the plate holder 29 in such a way that the photoconductive, coated side of each individual printing plate in the stack faces downwards.

The piston rod 35 carries a dish-shaped plate 30 at its end extending from the lifting cylinder 28. To this dish-shaped plate several suction elements 31 are fastened, which may be constructed as simple suction heads or, optionally, as spring suckers. The suction elements 31 are encompassed by springs which are arranged between the inner side of the plate 30 and the suction cups of the suction elements 31.

The lifting cylinder 28 is adapted to swivel about a pivotal point 32 by a power source 47 between an oblique position and a vertical position, as indicated by the double arrow A—A. In its receiving position, the lifting cylinder is swiveled about the pivotal point 32 so that it points perpendicularly towards the uncoated side of the uppermost printing plate. As soon as the piston rod 35 is extended and the dish-shaped plate 30 touches the printing plate which lies on top of the stack of printing plates, reduced pressure is applied to the suction elements 31, and the printing plate is sucked to the plate 30 and firmly held against it. The piston rod 35 is then partially retracted into the lifting cylinder until the printing plate 33 adopts a position indicated by the broken line in FIG. 1.

An air jet 38 is fastened to a bent support arm 37 at the upper end of the plate holder 29, and this air jet is adjusted to direct its air stream almost tangentially towards the underside of the printing plate 33 during its removal from the stack to the position indicated by the broken line. Usually, the individual printing plate 33 is covered by a sheet 36 of paper, plastic, film or the like. The air stream from the air jet 38, which is directed towards the printing plate picked off from the stack, detaches the sheet 36. This sheet 36 is for protecting the coated side of the printing plate from damage. The detached sheet 36 is blown by the air stream into a receiving tray 39 arranged below the exposure table.

Figure 2:
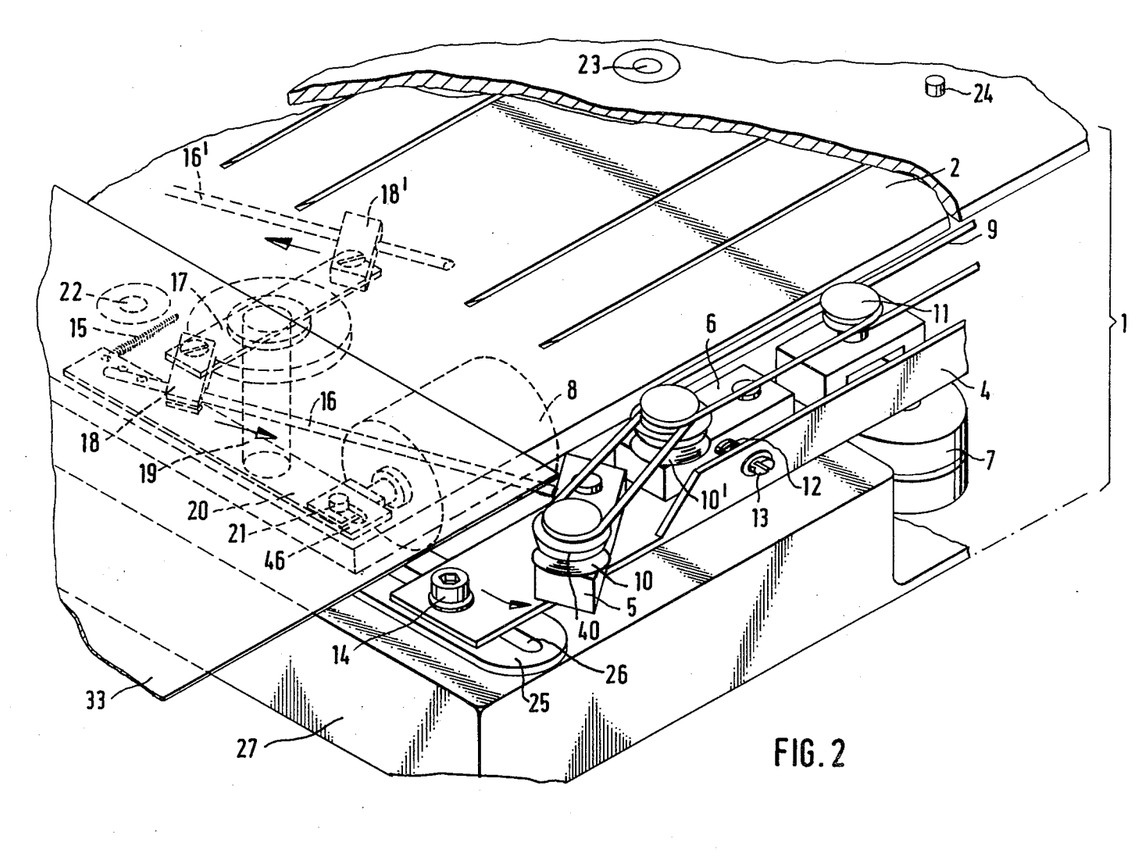
FIG. 2 is a partial perspective view of the exposure table, in which the front transport rollers are swiveled outwardly.
Figure 3:
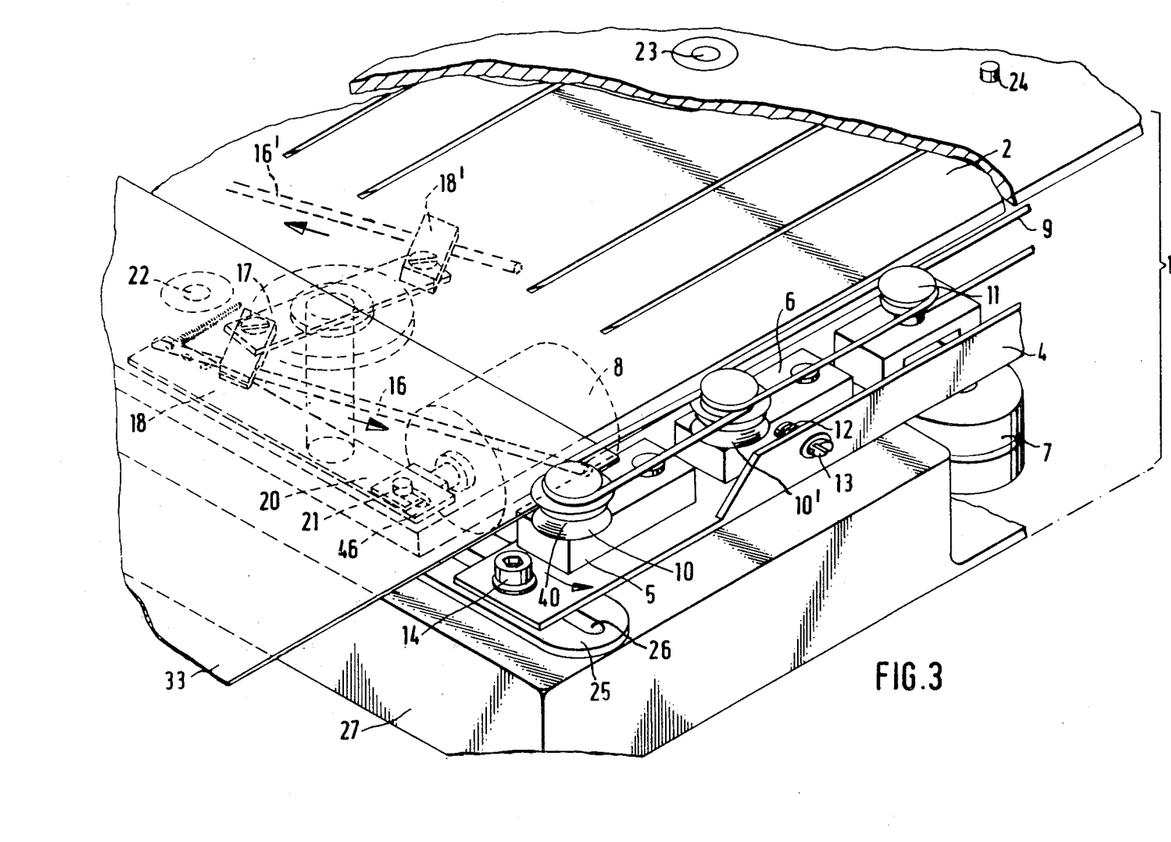
FIG. 3 is a similar perspective view of the exposure table according to FIG. 2, in which the front transport rollers are swiveled inwardly.

Then the lifting cylinder 28 is swiveled about the pivotal point 32 to adopt its vertical position and, as a result, the printing plate performs a rotating motion through a semi-circular arc and is deposited, from above, with its forward part on the suction plate 2 of the exposure table 1, as shown in FIGS. 2 and 3.

A row of rollers is arranged on either side of the exposure table. That is, there are two rows of rollers with a space therebetween, the exposure table being located in the space between the rollers. The first two rollers in each row are transport rollers 10, 10$^i$ and the next roller in each row is a drive roller 11 which, in turn, is followed by transport rollers 10$^{ii}$, 10$^{iii}$ and 10$^{iv}$, as shown in the diagrammatic view of FIG. 1. The number of transport rollers and drive rollers is not limited to the number shown in the drawing; and it is also possible to have less or more than five transport rollers in each row and to install two drive rollers instead of one, if required.

For reasons of clarity, FIGS. 2 and 3 depict only one of the two rows of transport and drive rollers. It is understood that the row of rollers which is not shown corresponds in arrangement to the row shown in the drawing.

The exposure table 1 comprises a suction plate 2, upon which the printing plate is deposited by the lifting cylinder 28, so that its front edge lies between the first transport roller 10 and the second transport roller 10$^i$. It has already been noted that the transport rollers as well as the drive rollers are arranged in pairs on either side of the suction plate 2. Whenever a transport roller or a drive roller is mentioned in the specification, it is meant to represent, in each case, a pair of rollers, as may be gathered from the description given above.

The transport rollers 10, 10$^i$, 10$^{ii}$ . . . and the drive roller 11 in one row are rotatably mounted on roller blocks which are attached to an angle bar 4. Of these roller blocks, those which are the first in the direction of transport are constructed as swivel blocks 5, while the other roller blocks 6 are only laterally displaceable and/or are stationarily mounted. FIG. 2 shows the arrangement of the transport rollers, wherein the first rollers 10 in the transport direction of the printing plate 33 are swiveled outwardly from each of the two rows of transport rollers, thus rendering it possible to place the printing plate 33 with its forward part on the suction plate 2 of the exposure table 1, without giving rise to jamming.

When the printing plate 33 is deposited on the exposure table, a lifting magnet 8, which is mounted below the suction plate 2 or below the exposure table 1, respectively, is triggered and switched off by a front switch 22 or proximity switch. This lifting magnet is connected to the swivel blocks 5 by a lever system which comprises a lower side bar 20 carrying a coupling pin 21 which engages in a slot of a clamping plate 46 attached to the guide bar of the lifting magnet 8. The lever system further comprises a connecting shaft 19 between the lower side bar 20 and an upper side bar 17; clamping knuckles 18 and 18' which are fastened to the periphery of the upper side bar 17; and connecting rods 16 and 16' which extend between the clamping knuckles and the swivel blocks 5. The lower side bar is engaged by one end of a tension spring 15 which extends parallel to the lifting magnet 8 and is fastened with its other end to the exposure table 1. As soon as the printing plate actuates the front switch 22 or proximity switch, the lifting magnet 8 is triggered and switched off; and the tension spring 15 pulls the swivel blocks 5 toward the printing plate 33 by way of the lever system.

Each of the transport rollers 10, 10$^i$, 10$^{ii}$ . . . is provided with a groove 40 in which the lateral edges of the printing plate 33 are guided during transport. When the swivel blocks 5 are turned toward the printing plate 33, the rotating transport rollers 10 engage the printing plate 33 and pull it entirely on the suction plate 2 of the exposure table 1. The transport rollers are driven by the drive roller 11 in each row of transport rollers. For this purpose, a drive motor 7 is mounted on the angle bar 4, which drives the drive roller 11. The two motors 7 in the two rows of rollers are constructed as synchronous motors; and consequently, synchronous running of these motors and of the drive rollers is constantly ensured. Transmission O-rings or drive belts 9 lead from each drive roller 11 to the adjacent transport rollers 10$^i$, 10$^{ii}$. Similarly, the transport roller 10$^{ii}$ is connected to the following roller 10$^{iii}$ by a drive belt 9, while another belt 9 connects the transport roller 10$^i$ with the first transport roller 10 on the swivel block 5.

The roller blocks 6 of the transport rollers 10$^i$, 10$^{ii}$, 10$^{iii}$ . . . are adapted to be displaced transversely to the direction of transport of the printing plate 33 with the aid of adjusting screws 13. Adjusting screws 13 are passed through the vertical arm of the angle bar 4 and engage in the corresponding roller blocks. Each adjustment screw 13 is surrounded by a compression spring 12 which rests against the inner wall of the vertical arm of the angle bar 4 and against the roller block 6. By means of the compression spring 12, it is ensured that the individual roller blocks 6 are capable of yielding sideways during transport, so that even slight deviations or oblique positions of the printing plate 33 in transport are compensated for by the elastic mounting of the roller blocks. It is possible to equip all roller blocks 6 in the two rows of transport rollers with adjusting screws 13 or to provide adjusting screws in one row only, the other row of transport rollers being in that case stationarily mounted on the angle bar 4.

The printing plate 33 is moved forward on the suction plate 2 until it contacts a stop pin 24 which is capable of being lowered into the suction plate 2. As soon as the printing plate is positioned by the stop pin 24, reduced pressure is applied to the suction plate 2. The printing plate 33 is thus retained in its position for exposing.

A horizontally displaceable exposure carriage 41 (FIG. 1) arranged above the exposure table 1 is equipped with optical elements 42 for scanning an original 43 and for exposing the printing plate 33. Since these processing stations are devices which are known in the art, they are not described in further detail.

A corona device 34, fastened to the underside of the exposure carriage 41, charges the printing plate 33 when the exposure carriage is horizontally displaced. The printing plate is subsequently exposed; and after exposure, the stop pin 24 is lowered so that the printing plate 33 can be transported further to the developing table 3 by means of the transport rollers 10, 10$^i$, . . . The developing table is connected to a drive shaft 45 arranged below the table and can be moved to and fro along this drive shaft in the direction of the double arrow B—B. Via a developing unit 44 which is positioned above the developing table 3, a developer coat composed of a mixture of carrier particles and toner is applied to the surface of the printing plate 33 by a magnetic brush, while the printing plate 33 is guided past underneath the developing unit 44.

The reduced pressure of the suction plate 2 is, of course, released before the printing plate is further transported. When the rear edge of the printing plate 33 clears (FIG. 2) a rear switch 23 or proximity switch, the lifting magnet 8 is triggered and energized by means of that switch. As a result, the lever system 16 to 21 rotates the swivel blocks of the first transport rollers 10 into the open position against the tension of the tension spring 15. In this position, it is possible to introduce a fresh printing plate 33.

It is obvious to the man skilled in the art that, instead of a front and a rear switch 22 and 23 or a proximity switch, any other signal generator that may be electrically connected to the lifting magnet 8 and that de-energizes or energizes the magnet can optionally be employed.

On the upper side of the suction plate support 27 of the exposure table 1, two guiding elements are provided. FIGS. 2 and 3 show only the front guiding element 25 which is arranged transversely to the direction of transport of the printing plate 33. The second guiding element which is not shown extends parallel to the first guiding element, close to the rear edge of the suction plate support 27. Each of the guiding elements 25 has at least one slot 26. The angle bars 4 are supported on the guiding elements 25 and each angle bar has a fixing screw 14 at its front and rear end. These fixing screws engage in the slots 26 in the chosen positions of the angle bars 4. It is thus possible to displace the angle bars 4 along the guiding elements 25, transversely to the transport direction of the printing plates and to secure the angle bar by the fixing screws 14 in the position desired in each case. Since the angle bars 4 carrying the swivel blocks and the roller blocks with the transport and drive rollers are adjustable, it is possible to adapt the mechanism to printing plates of different widths. Similarly, suction plates 2 of different sizes can be mounted on the suction plate support 27; and, also by this measure, different sizes of the printing plates 33 can be taken into account.

Instead of the single air jet depicted in FIG. 1, several air jets may be provided which are partly adjusted to have different directions of the air streams. This is in order to ensure that the sheet 36 is invariably conveyed into the receiving tray 39.

What is claimed is:

1. A mechanism for feeding printing plates to an exposure table, which exposure table includes a suction plate for holding a printing plate in place, the printing plates being fed to the exposure table in a transport direction, each printing plate having a forward part which approaches the exposure table first during feeding of the printing table in the transport direction, each printing plate having a pair of lateral edges, the mechanism comprising:
   a plurality of transport rollers;
   a plurality of drive rollers, said transport and drive rollers cooperating with each other;
   said transport and drive rollers being mutually so arranged as to include two rows of rollers with a space between each row, each row including a plurality of transport rollers and at least one drive roller, said rollers being arranged so as to be in generally parallel relationship with the lateral edges of a printing plate which may be disposed in said space between said rows, said rows extending in the transport direction, each row including a transport roller which is the first roller relative to the transport direction in such row, whereby said two rows together include two first rollers; and
   means for effecting swiveling movement of said two first rollers in an outward direction relative to said space between said rows to enable the forward part of each printing plate to be deposited on the suction plate of the exposure table without damage.

2. A mechanism as claimed in claim 1, including:
   an angle bar which serves as a base for the mounting of the rollers of one row, each row including an angle bar;
   a plurality of roller blocks on which said drive rollers and transport rollers are rotatably mounted; the roller blocks on which said two first rollers are mounted being swivelable with respect to said angle bar, said means for effecting swiveling movement including said swiveling blocks.

3. A mechanism as claimed in claim 2, wherein the suction plate is at least partially disposed in the space between said rows of rollers, said means for effecting swiveling movement further comprising a lifting magnet below said suction plate and a lever means for transferring movement of said lifting magnet to said swivelable blocks; said lifting magnet, said lever means and said swivelable blocks being operatively coupled together.

4. A mechanism as claimed in claim 3, wherein said suction plate includes an upper side for holding the printing plate and a lower side below and opposite the upper side, wherein said lever means comprises:
   a lower side bar for location below the suction plate;
   a coupling pin;
   a clamping plate coupled with said lifting magnet;
   a slot in said clamping plate, said lower side bar carrying said coupling pin, said coupling pin engaging in said slot of said clamping plate;
   a connecting shaft;
   an upper side bar for location below the suction plate but above said lower side bar, said upper side bar having peripheral ends, said connecting shafts extending between said lower side bar and said upper side bar;
   a plurality of clamping knuckles, said clamping knuckles being fastened to said peripheral ends of said upper side bar; and
   a plurality of connecting rods, said connecting rods extending between said clamping knuckles and said swivelable blocks.

5. A mechanism as claimed in claim 4:
   wherein said lower side bar has ends, and wherein said coupling pin cooperates with said lower side bar at a location close to one end of said lower side bar;
   including a tension spring having ends, said tension spring extending generally parallel to said lifting magnet, one end of said tension spring engaging the other end of said lower side bar, the other end of said tension spring being for coupling with the exposure table.

6. A mechanism as claimed in claim 3, including a front and a rear signal generator for arrangement in the suction plate, said signal generators being electrically connected to the lifting magnet, which magnet is selectively de-energized and energized by these signal generators.

7. A mechanism as claimed in claim 6, wherein each printing plate has a front edge adjacent the forward part thereof and a rear edge opposite the forward edge and wherein said signal generators are switches which are actuated by the front edge and the rear edge, respectively, of the printing plate.

8. A mechanism as claimed in claim 6, wherein said signal generators are proximity switches.

9. A mechanism as claimed in claim 2, wherein the drive roller of each row has at least one transport roller adjacent thereto and wherein the transport rollers of each row include at least one pair of adjacent transport rollers;
   including two drive motors, one for each row of rollers, each drive motor being fastened to the angle bar for its respective row of rollers;
   including a plurality of drive belts, some of which extend between said drive rollers and adjacent transport rollers and some of which extend between each pair of adjacent transport rollers, whereby said transport rollers are driven by said drive rollers via said drive belts.

10. A mechanism as claimed in claim 9, wherein said two drive motors are synchronous motors.

11. A mechanism as claimed in claim 2, wherein said angle bar includes a vertical arm with an inner wall which faces toward said space between said rows of rollers, wherein at least some of said roller blocks are coupled with means for accommodating transverse displacement thereof with respect to the transport direction, each displacement accommodating means being in one of said rows and including an adjusting screw, each adjusting screw passing through said vertical arm of the angle bar in its respective row and engaging a roller block.

12. A mechanism as claimed in claim 11, wherein each adjusting screw is surrounded by a compression spring which rests against said inner wall of said vertical arm of the angle bar of its respective row and which rests against the roller block.

13. A mechanism as claimed in claim 11 or 12 wherein all of the roller blocks of the two rows of transport rollers are equipped with adjusting screws.

14. A mechanism as claimed in claim 11 or 12, wherein the roller blocks of one of the rows of transport rollers are equipped with adjusting screws and are, consequently, displaceable, while the roller blocks of the other row of transport rollers are stationarily mounted on the angle bar.

15. A mechanism as claimed in claim 1, wherein each transport roller has a groove in which one lateral edge of the printing plate is guided during transport.

16. A mechanism as claimed in claim 2;
wherein the suction plate is supported by a suction plate support, the suction plate support having an upper side facing the suction plate;
including a pair of guiding elements for arrangement on the upper side of the suction plate support in transverse relationship with respect to the transport direction, said guiding elements including at least one slot therein;
wherein angle bars are supported on said guiding elements, said angle bars having front and rear ends and a fixing screw at each end, said fixing screws engaging said slots in selected positions along said slots;
whereby the positions of said angle bars are transversely adjustable relative to the transport direction.

17. A mechanism as claimed in claim 3, including a selectively raisable and lowerable stop pin in said space between said rollers, said stop pin being for disposition in the suction plate to serve as a selective stop for the printing plate.

18. A mechanism for feeding and transporting printing plates to an exposure table, which exposure table includes a suction plate for holding a printing plate in place, the printing plates being fed to the exposure table in a transport direction, each printing plate having a forward part which approaches the exposure table first during feeding of the printing plate in the transport direction, each printing plate having a pair of lateral edges, the mechanism comprising:
a swiveling lifting cylinder;
a plate holder for holding printing plates, said swiveling lifting cylinder cooperating with said plate holder to remove plates from said plate holder;
means for effecting displacement of said lifting cylinder so that the lifting cylinder moves through an arc and deposits the forward parts of the printing plates on the suction plate;
a plurality of transport rollers;
a plurality of drive rollers, said transport and drive rollers cooperating with each other;
said transport and drive rollers being mutually so arranged as to include two rows of rollers with a space between each row, each row including a plurality of transport rollers and at least one drive roller, said rollers being arranged so as to be in generally parallel relationship with the lateral edges of a printing plate which may be disposed in said space between said rows, said rows extending in the transport direction, each row including a transport roller which is the first roller relative to the transport direction in such row, whereby said two rows together include two first rollers; and
means for effecting swiveling movement of said two first rollers in an outward direction relative to said space between said rows to enable the forward part of each printing plate to be deposited on the suction plate of the exposure table without damage.

* * * * *

UNITED STATES PATENT AND TRADEMARK OFFICE
CERTIFICATE OF CORRECTION

PATENT NO. : 4,334,472

DATED : June 15, 1982

INVENTOR(S) : BACK, ET AL.

It is certified that error appears in the above—identified patent and that said Letters Patent is hereby corrected as shown below:

IN THE CLAIMS:

Claim 1, line 7, (column 9, line 23), delete "table", insert -- plate -- therefor.

Claim 4, line 14, (column 10, line 9), delete "shafts", insert -- shaft -- therefor.

Signed and Sealed this

Fourteenth Day of December 1982

[SEAL]

Attest:

Attesting Officer

GERALD J. MOSSINGHOFF

Commissioner of Patents and Trademarks